Jan. 30, 1951 E. LABIN ET AL 2,539,440

SINGLE CARRIER, SOUND AND COLOR VISION PULSE SYSTEM

Filed Sept. 27, 1945 3 Sheets-Sheet 1

INVENTORS.
EMILE LABIN
DONALD D. GRIEG
NORMAN H. YOUNG, JR.

BY Percy P. Lantzy
ATTORNEY

SINGLE CARRIER, SOUND AND COLOR VISION PULSE SYSTEM

INVENTORS.
EMILE LABIN
DONALD D. GRIEG
NORMAN H. YOUNG, JR.
BY Percy P. Lantzy
ATTORNEY

SINGLE CARRIER, SOUND AND COLOR VISION PULSE SYSTEM

Filed Sept. 27, 1945 3 Sheets-Sheet 3

INVENTORS.
EMILE LABIN
DONALD D. GRIEG
NORMAN H. YOUNG, JR.
BY Percy P. Lantzy
ATTORNEY Patented Jan. 30, 1951

2,539,440

UNITED STATES PATENT OFFICE 2,539,440

SINGLE CARRIER, SOUND AND COLOR VISION PULSE SYSTEM

Emile Labin, New York, Donald D. Grieg, Forest Hills, and Norman H. Young, Jr., Jackson Heights, N. Y., assignors to Federal Telephone and Radio Corporation, New York, N. Y., a corporation of Delaware Application September 27, 1945, Serial No. 618,966

3 Claims. (Cl. 178—5.2)

This invention relates to new and useful improvements in televesion transmission systems, but certain features of the invention are applicable also to the transmission of other kinds of intelligence.

An object of the invention is to permit the transmission on a single carrier frequency of signals representing a plurality of different kinds of intelligence, such as picture signals, synchronizing signals and sound signals.

Further objects of the invention are the provision of a single signal train of picture signals, synchronizing and sound signals; the provision of pulses for the synchronizing and sound signals differing in shape characteristics from each other; and distinguishing certain of the signal pulses according to one characteristic and others by still another characteristic.

These and other objects of the invention will more clearly appear from the following description of a preferred embodiment and the appended claims.

Figure 1:
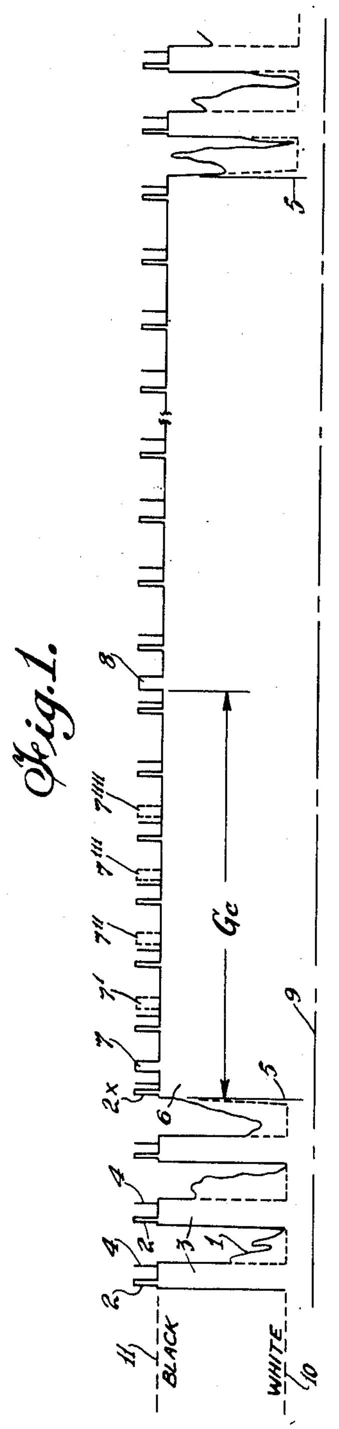
Fig. 1 is a curve illustrating the pulses transmitted and received.
Figure 4:
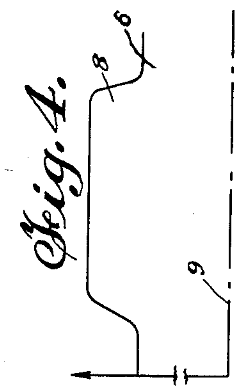
Figs. 2, 3 and 4 show portions of Fig. 1 on an enlarged scale.

Referring to Fig. 1, the amplitude modulations of a carrier representing the picture signals 1 are separated by horizontal synchronizing pulses 2. Each horizontal pulse is carried by a horizontal blanking pedestal 3 on said carrier and carrying in addition to pulse 2 a second pulse 4 whose spacing with respect to pulse 2 is varied depending on the sound to be transmitted. Thus, the time or phase modulation of pulse 4 with respect to pulse 2 is used for transmitting the sound accompanying the picture signals, and no separate frequency band need be provided for this purpose.

Figure 2:
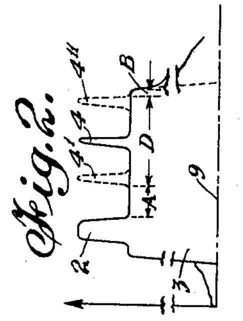

Fig. 2 gives an enlarged view of these synchronizing and sound pulses. Assuming that the width of the horizontal blanking pulse or pedestal is 0.16H (the distance between the leading and trailing edges), where H is the time consumed by one horizontal blanking pulse 3 and a line trace signal 1, the width of pulse 2 at its top may be only one-tenth of that, or .016H. Pulse 2 is preferably wider at its base by .0032H and it has its leading edge substantially .008H from the leading edge of pulse 3 to insure that when pulse 2 is super-positioned on pulse 3 their leading edges will not be distorted, as might occur when the timing of these pulses is minutely incorrect.

The sound pulse 4 is preferably only half as wide as 2, i. e., .008H, at the top and spreads to the same extent at the bottom as does 2, i. e., it is .0032H wider. The displacement D of the pulse 4 in response to sound modulation may be ±0.048H. The guard time interval A between the lagging edge of pulse 2 and the nearest time displacement limit 4′ is .019H, and the guard time interval B just preceding the lagging edge of pedestal 3 and the nearest time displacement limit 4″ is .006H. It will be understood, of course, that these relative dimensions are given by way of example only.

At the end or bottom of each picture frame, vertical blanking takes place under the control of a vertical pedestal 6 whose width between lines 5—5 of Fig. 1 may be equal to .05V, where V is the vertical field time, that is, the time consumed in transmitting the intelligence for one complete field. During this period .05V the sending of horizontal synchronizing pulses and sound pulses is continued while one or more vertical or frame synchronizing pulses 7 are sent. The leading edge of the first or only synchronizing pulse 7 is preferably 1.25H from the leading edge of the last pulse 2X marking the bottom of the picture frame and coinciding with line 5. If, as indicated in dotted lines, additional synchronizing pulses such as 7′, 7″, 7‴, 7⁗, are placed on pedestal 6, then these are also spaced 1.25H from the next preceding horizontal synchronizing pulse 2.

For colored television, a color-phasing pulse 8 is placed on the vertical blanking pulse 6 a suitable period Gc following the leading edge of pulse 6. For further details of color television, reference is made to the copending application of Donald D. Grieg, Serial No. 572,696, filed January 13, 1945, now Patent No. 2,465,371, granted March 29, 1949.

Line 9 represents the axis of the carrier, line 10 the whitest and line 11 the blackest picture signal that is transmitted. The black line 11 corresponds to 75% modulation and the tops of the pulses 2, 4, 7 and 8 to 100% modulation of the carrier.

Figure 3:
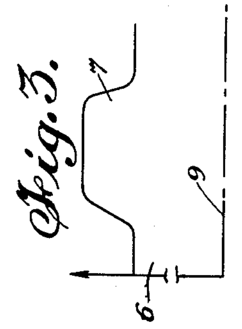

Referring to Fig. 3, the width of the vertical synchronizing pulse 7 is preferably .0315H at the top and .0475H at the base or practically twice as wide as a horizontal pulse 2.

Color-phasing pulses 8 are still wider; they may be .126H wide at the top and .142H at the bottom.

The following tables give by way of example the timing of the various impulses:

WAVEFORM DIMENSIONS IN MICROSECONDS

Monochromatic H=22050 cps.=45.4 μ sec.
Color H=31500=31.7 μ sec.

*For horizontal blanking pedestal 3*

| Type | Ped. Width | Sync Pulse Width | Sound Pulse Width | Guard Time A | Guard Time B | Mod. Displ. D | Build-up, Time, Sound, Sync | Decay Time, Sound and Sync |
|---|---|---|---|---|---|---|---|---|
| M [1] | 7.3 | 0.7 | 0.35 | 0.85 | 0.3 | ±2.2 | 0.07 | 0.07 |
| C [1] | 5.0 | 0.5 | 0.25 | 0.6 | 0.2 | ±1.5 | 0.05 | 0.05 |

*For vertical blanking pedestal 6*

| Type | V Sync Pulse Width | V Sync Pulse Buildup | V Sync Pulse Decay | Color Pulse Width | Color Pulse Buildup | Color Pulse Decay | Blanking Repetition Period |
|---|---|---|---|---|---|---|---|
| M [1] | 1.5 | 0.35 | 0.35 | -------- | -------- | -------- | 1/60 sec. |
| C [1] | 1.0 | 0.25 | 0.25 | 4.0 | 0.25 | 0.25 | 1/120 sec. |

[1] M—Monochromatic. C—Color.

Pulse width measured at top of pulse.

Successive frames may be interlaced in any suitable manner.

It is noted again that all required picture, sound and color signals are sent on a single carrier and, as will be shown below, require relatively simple and well-known equipment for their generation and transmission.

Figure 5:
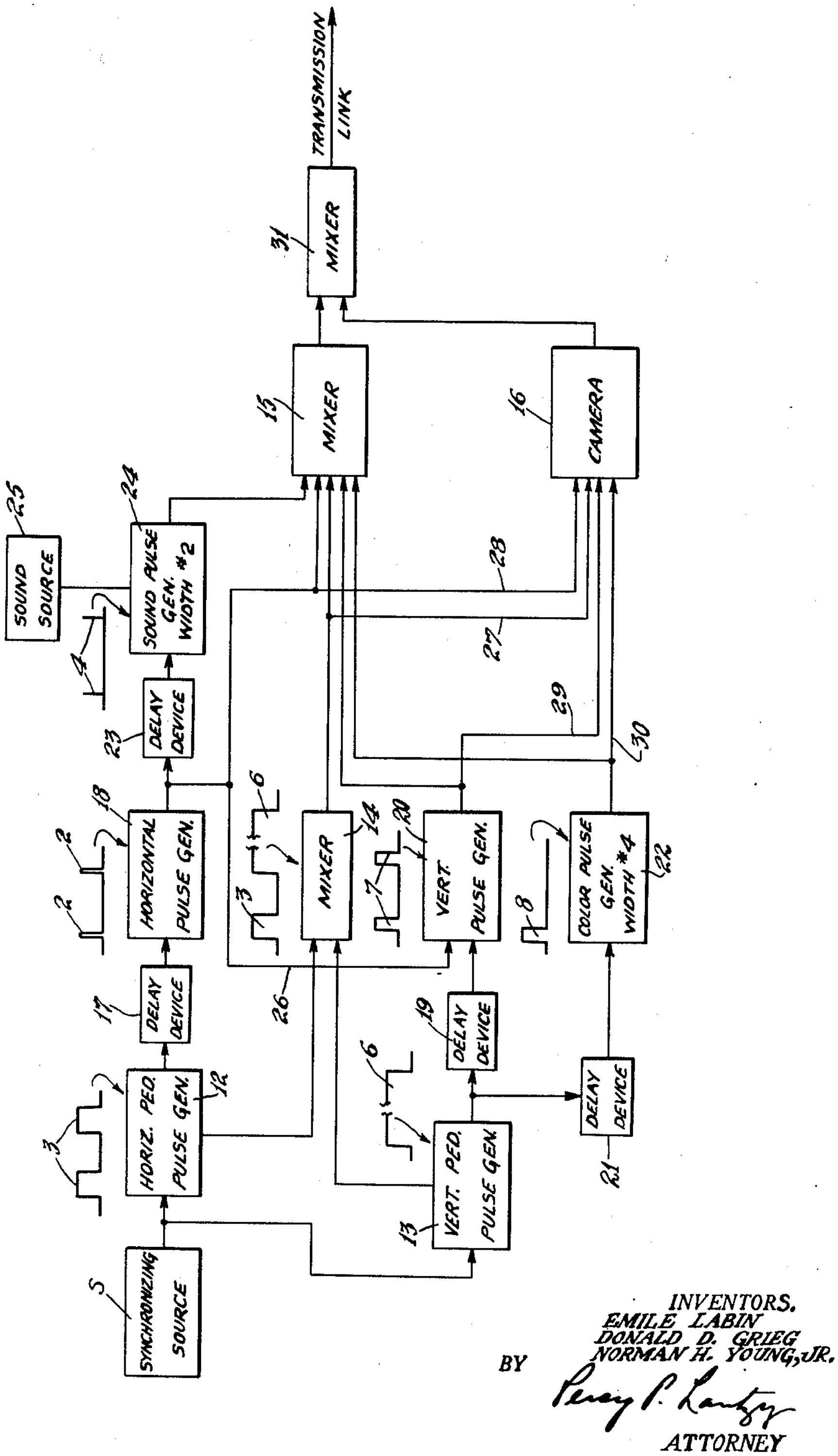
Fig. 5 is a block diagram of as much of a television transmitter as is necessary for understanding the present invention.

Fig. 5 is a block diagram of the important elements suitable for the transmission of the signals illustrated in Fig. 1. The horizontal pedestals 3 are generated at 12 and the vertical pedestals 6 at 13. These two generators are synchronized from signals from source S. The pulses generated at 12 and 13 are fed to mixer circuit 14 which transmits them in their time sequence to mixer 15 and to camera 16.

The pulses representing the pedestals 3 are fed through a delay device 17, either electronic or of the passive network type, to a horizontal synchronizing pulse generator 18 which will produce the horizontal marker pulses 2 and feed them to the mixer 15. Similarly, the vertical pedestals 6 are fed by generator 13 through a delay device 19 to a vertical synchronizing pulse generator 20 which will produce the vertical synchronizing pulses 7 and supply them to the mixer 15. It will be understood, of course, that instead of using pedestal pulses 3 and 6 to control generators 18 and 20, signals may be taken from synchronizing source S.

Where color-phasing pulses are required the generator 13 may be connected through delay device 21 to a generator 22 for production of color-phasing pulses 8, and these pulses are also fed into the mixer 15.

The generator 18 of the horizontal synchronizing pulses is preferably connected through a delay device 23 with a time pulse modulator 24 for producing sound pulses 4 whose phasing or timing with respect to the marker pulses 2 may be modulated from an audio source 25. The modulator 24, which may be any known pulse time modulator such for example as shown in U. S. Patent No. 2,266,401 or in the copending application of E. Labin, Serial No. 546,378, filed July 24, 1944, now Pat. No. 2,445,783, granted July 27, 1948, is also connected with the mixer 15.

Where it is required that more than one vertical synchronizing pulse 7 be positioned on each vertical pedestal 6, output of generator 18 is, as indicated by line 26, inter-synchronized with the vertical synchronizing pulse generator 20.

Before transmission, the synchronizing signals 3, 6; 2, 7 and 8 are passed over lines 27, 28, 29 and 30 to the camera 16, the synchronizing pulses also being passed through mixer 15 and then to a further mixer 31 to which the camera 16 supplies the picture signals.

The balance of the transmitter may be of any customary type for broadcasting the signals of Fig. 1 or transmitting them through any suitable medium to a receiver.

Figure 6:
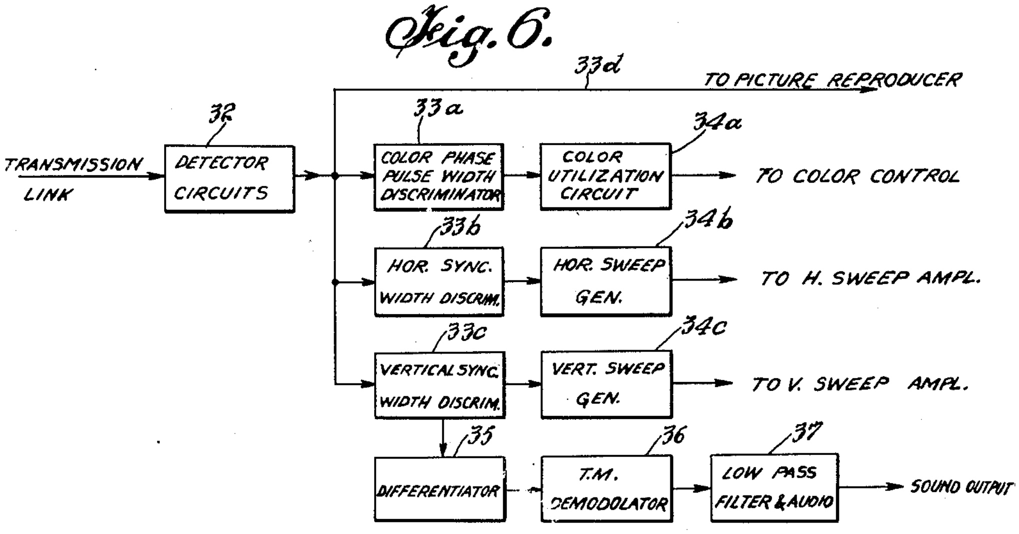
Fig. 6 is a block diagram of as much of a television receiver as is necessary for understanding the present invention.

Only those elements of a receiver are shown in Fig. 6 which are necessary for an understanding of the present invention.

The detector circuit 32 applies the incoming signals after reception by known receiver circuits in parallel to three circuits 33*a*, 33*b* and 33*c* adapted to discriminate between the pulses according to pulse width, and a fourth circuit 33*d* to a picture reproducer. Pulse width discriminator 33*a* selects only the color phasing signals 8, pulse width discriminators 33*b* and 33*c* select the horizontal and vertical synchronizing pulses respectively.

Circuit 33*a* responds only to pulses 8 having a width of 5.7 microseconds, removes them by translation and clipper action and sends them to a color utilization circuit 34*a*. From this point the color control of the receiver may follow any customary pattern.

The circuit 33*b* removes only the horizontal synchronizing pulses 2 and applies them to a horizontal sweep generator 34*b* controlling the horizontal sweeping of the cathode ray tube or the like (not shown) of the receiver.

Circuit 33*c* segregates the vertical pulses 7 to operate a vertical sweep generator 34*c* of the cathode ray tube.

The pulses 4 representing the sound are taken off at circuit 33*c* and are sent through differentiator network 35 to demodulator 36 whose output will contain the amplitude modulated equivalent of pulses 4. The sound wave is fed via a low pass filter 37 to the sound output of the receiver.

The picture signal responsive elements of the receiver may be of any conventional type to which circuit 33d is connected.

While the width discriminators of Fig. 6 may be of any suitable type, the type disclosed in the copending application of Emile Labin and Donald D. Grieg, Serial No. 487,072, filed May 15, 1943, now Pat. No. 2,440,278, granted April 27, 1948, is preferred. Their important elements are shown in Fig. 7.

Figure 7:
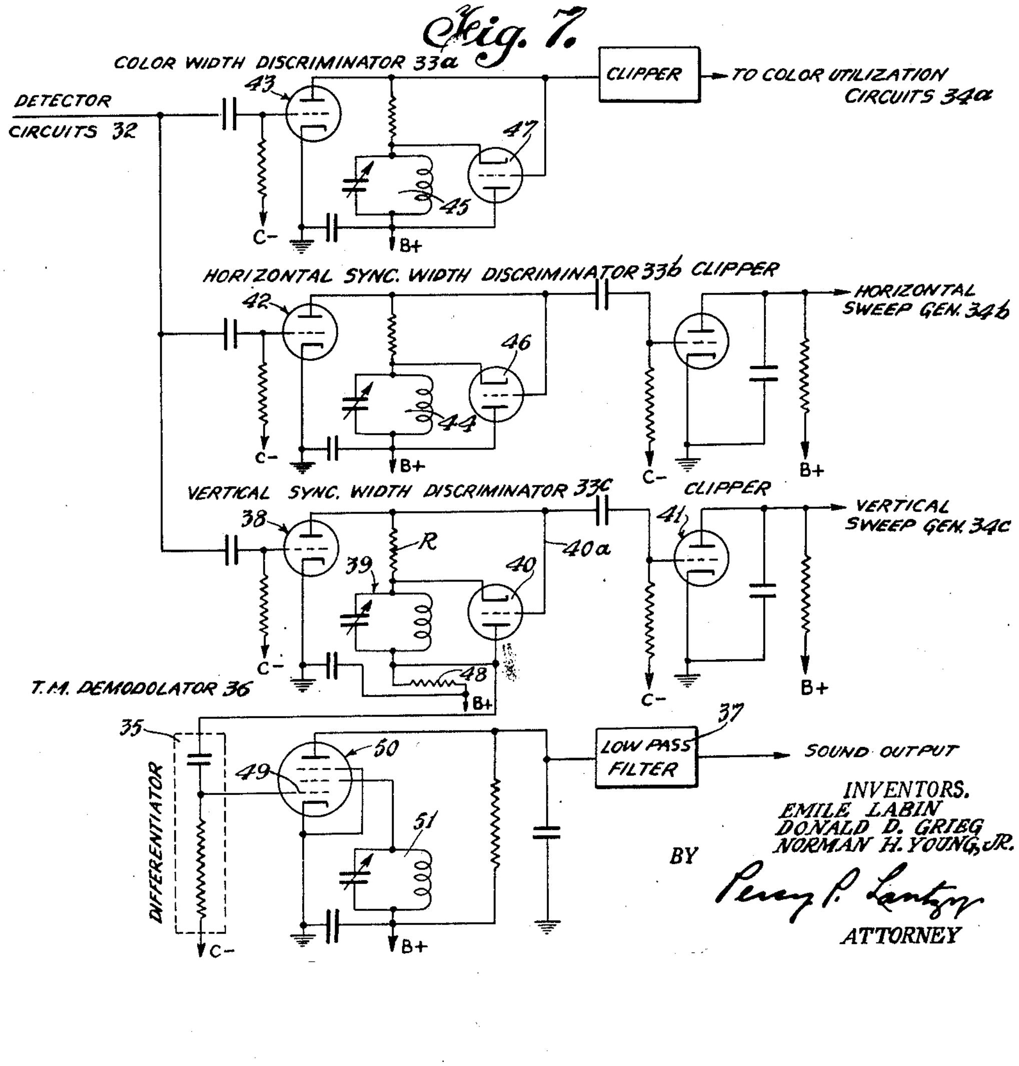
Fig. 7 shows one embodiment with circuit which may be used in the receiver of Fig. 6.

The discriminator 33c, Fig. 7, consists of a limit clipping tube or amplifier 38, a tuned circuit 39, and an oscillation damping tube 40. The amplifier tube 38 has its grid so biased that it limits all pulses to a predetermined amplitude for application to the L-C circuit 39 over a resistance R. This circuit is adjusted to be shock-excited to maximum oscillation only by pulses of a predetermined width. The tube 40, bridged across circuit 39, is maintained blocked by the pulse energy applied to circuit 39 over grid connection 40a. The electrode connections of tube 40 are such that the tube conducts only when the oscillations go negative, whereby only a single positive undulation is passed to clipper tube 41 for each input pulse. The input pulse having the width corresponding to the tuning of circuit 39, that is, the one having a width equal to one half the wavelength of the frequency to which the circuit is tuned, will produce the undulations of maximum amplitude. The tube 41 is negatively biased to clip only the maximum undulations thereby rejecting those produced by pulses of width different from the chosen width for the vertical synchronizing pulses.

Similarly, discriminators 33a and 33b are provided with limit clipping tubes 42, 43, L-C circuits 44, 45, and damping tubes 46, 47, respectively. The only difference is that the circuits 44, 45 are adjusted for maximum oscillation in response to pulses of widths such as those chosen for the color and horizontal synchronizing pulses, respectively.

The sound pulses 4 are derived from the anode of tube 40 of discriminator 33c, Fig. 7, across resistor 48 and are applied over differentiator 35 to the negatively biased control grid 49 of a pentode 50 in demodulator 36. They control the shock-excitation of L-C circuit 51 whose adjustment will determine the translation function of the demodulator.

Figure 8:
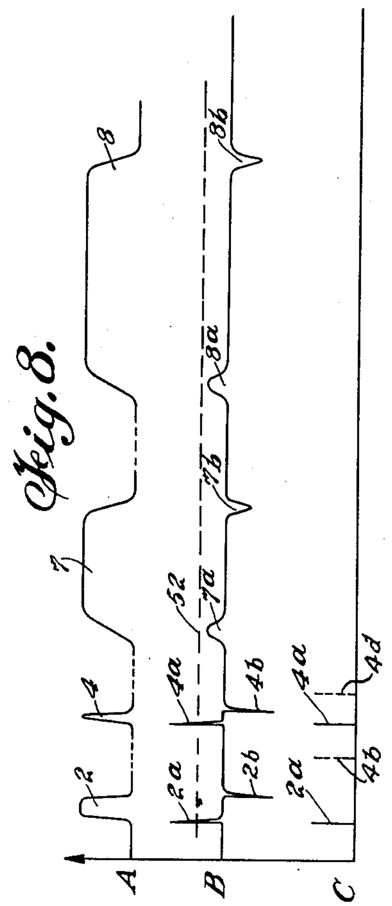
Fig. 8 is a graph used in explaining the operation of the sound channel in the circuit of Fig. 7.

It should be understood that circuits 33a and 33b may have been provided with a similar resistor 48 for the taking off of pulse energy for demodulator 36, should it be desired. The different types of pulse energy obtained across resistor 48 are indicated by graph A of Fig. 8. When this pulse energy is differentiated at 35 it assumes the shape illustrated in graph B. The pulses 2a, 2b, 4a and 4b are of much greater amplitude than the derivative pulses 7a, 7b, 8a and 8b resulting from the input pulses 7 and 8. The reason for this is the difference in the build-up and decay characteristics of the leading and trailing edges of the input pulses. For example, the pulses 2 and 4 have sharp build-up and decay characteristics while the pulses 7 and 8 have much slower build-up and decay characteristics. Thus, upon differentiating the input pulses, the derivative pulses obtained therefrom may be discriminated by a proper clipping level as indicated at 52, graph B. This clipping is effected by the negative biasing of the grid 49 of tube 50 so that pulses 2a and 4a, for example, are the only pulses that affect the tuned circuit 51. The dotted lines 4b and 4d in Fig. 8c illustrate the limits within which pulses such as 4a may be modulated in time with respect to pulses such as 2a.

For a further understanding of demodulator circuit 36, reference may be had to the copending application, Serial No. 459,959, filed September 28, 1942, now Pat. No. 2,416,306 granted Feb. 25, 1947. The demodulator operation effects a translation of the time displacement of the pulses 4a into pulses of corresponding amplitude. This is effected by an interaction between the oscillatory energy from circuit 51 and the pulse energy 2a and 4a which occurs above the cut-off level of tube 50. The envelope energy defined by the peaks of the output pulses of tube 50 is obtained by low-pass filter 37.

While the invention has been described in connection with a particular embodiment and given pulse dimensions, it will be understood that same is intended to be illustrative of the invention only and not as limiting the scope of the invention as set forth in the objects and the appended claims.

We claim:

1. In television transmission the method of producing a composite television signal which comprises generating regularly repeating vertical synchronizing pulses and color-phasing synchronizing pulses differing in width from each other, generating horizontal synchronizing pulses and sound pulses having further difference in width and additionally characterized by differences in pulse build-up time from the pulse build-up time of the other pulses, mixing all of said pulses in spaced time sequence to form one pulse train, and transmitting said pulse train.

2. In a television transmission system wherein is produced a composite television signal including pulses utilized for different purposes, means for producing vertical synchronizing pulses, horizontal synchronizing pulses, color-phasing pulses, and sound pulses, said pulses differing from each other in width and said horizontal synchronizing and sound pulses having a build-up time different from other pulses, means for combining all of said pulses in spaced time sequence to form a single pulse train, and means for transmitting the pulse train.

3. In television transmission the method of producing a composite television signal which comprises generating regularly repeating vertical synchronizing pulses, horizontal synchronizing pulses, color-phasing synchronizing pulses, and sound pulses, said pulses differing from each other in the width thereof, producing a difference in the build-up time of said sound pulses and the horizontal synchronizing pulses with respect to the build-up time of another of said pulses, combining said pulses in spaced time sequence to form one pulse train and transmitting said combined pulse train.

EMILE LABIN.
DONALD D. GRIEG.
NORMAN H. YOUNG, JR.

(References on following page)

REFERENCES CITED

The following references are of record in the file of this patent:

UNITED STATES PATENTS

| Number | Name | Date |
|---|---|---|
| 1,678,163 | Peterson | July 24, 1928 |
| 1,769,920 | Gray | July 8, 1930 |
| 2,137,798 | Bowman-Manifold | Nov. 22, 1938 |
| 2,166,688 | Kell | July 18, 1939 |
| 2,214,846 | Wilson | Sept. 17, 1940 |
| 2,268,001 | Von Felgel-Farnholz | Dec. 30, 1941 |
| 2,295,023 | Beatty | Sept. 8, 1942 |
| 2,319,789 | Chambers | May 25, 1943 |
| 2,326,515 | Bartelink | Aug. 10, 1943 |
| 2,333,969 | Alexanderson | Nov. 9, 1943 |
| 2,330,225 | Lang | Sept. 28, 1943 |
| 2,335,180 | Goldsmith | Nov. 23, 1943 |
| 2,378,746 | Beers | June 19, 1945 |
| 2,401,384 | Young | June 4, 1946 |
| 2,405,252 | Goldsmith | Aug. 6, 1946 |
| 2,408,063 | Grieg | Sept. 24, 1946 |
| 2,414,265 | Lawson | Jan. 14, 1947 |
| 2,437,300 | Labin | Mar. 9, 1948 |
| 2,465,371 | Grieg | Mar. 29, 1949 |
| 2,486,498 | Schlesinger | Nov. 1, 1949 |

OTHER REFERENCES

Synchronization in Television, pages 8 and 9 and Figure 6, Proceedings, Panel No. 8, National Television System Committee.